United States Patent
Ni et al.

(10) Patent No.: US 11,940,808 B2
(45) Date of Patent: Mar. 26, 2024

(54) SEASONAL CLEANING ZONES FOR MOBILE CLEANING ROBOT

(71) Applicant: iRobot Corporation, Bedford, MA (US)

(72) Inventors: Ottillia Shirhan Ni, Cambridge, MA (US); Ryan Schneider, Burlington, MA (US); Hyun Woo Paik, Ashland, MA (US); Eric Beowulf Martinson, Ann Arbor, MI (US); Danielle O'Connor Dean, Westford, MA (US)

(73) Assignee: iRobot Corporation, Bedford, MA (US)

( * ) Notice: Subject to any disclaimer, the term of this patent is extended or adjusted under 35 U.S.C. 154(b) by 48 days.

(21) Appl. No.: 17/522,381

(22) Filed: Nov. 9, 2021

(65) Prior Publication Data

US 2023/0142175 A1 May 11, 2023

(51) Int. Cl.
*G05D 1/00* (2006.01)
(52) U.S. Cl.
CPC ......... *G05D 1/0274* (2013.01); *G05D 1/0219* (2013.01); *G05D 1/0231* (2013.01)
(58) Field of Classification Search
CPC .. G05D 1/0274; G05D 1/0219; G05D 1/0231; G05D 2201/0203; G05D 2201/0215; A47L 2201/04; A47L 2201/06
See application file for complete search history.

(56) References Cited

U.S. PATENT DOCUMENTS

| | | | | |
|---|---|---|---|---|
| 9,844,879 B1* | 12/2017 | Cousins | | G01C 21/3691 |
| 2011/0264305 A1* | 10/2011 | Choe | | G05D 1/0274 |
| | | | | 701/28 |
| 2017/0273527 A1* | 9/2017 | Han | | G05D 1/0044 |
| 2017/0332862 A1 | 11/2017 | Jun et al. | | |
| 2018/0225734 A1* | 8/2018 | Towal | | G06Q 10/06 |
| 2019/0061157 A1* | 2/2019 | Suvarna | | B25J 11/0085 |
| 2020/0317445 A1* | 10/2020 | Schultz | | B25J 9/023 |
| 2020/0341477 A1* | 10/2020 | Baek | | A47L 9/2852 |
| 2020/0375429 A1 | 12/2020 | Munich et al. | | |
| 2021/0138659 A1 | 5/2021 | Arora et al. | | |
| 2021/0282613 A1 | 9/2021 | Fong et al. | | |

FOREIGN PATENT DOCUMENTS

| | | |
|---|---|---|
| CN | 116098521 | 5/2023 |
| WO | 2018155999 | 8/2018 |

OTHER PUBLICATIONS

"European Application Serial No. 22206403.2, Extended European Search Report dated Mar. 30, 2023", 7 pgs.

"Chinese Application Serial No. 202211397048.1, Response filed Mar. 28, 2023 to Office Action dated Jan. 11, 2023", w English claims, 35 pgs.

\* cited by examiner

*Primary Examiner* — Khoi H Tran
*Assistant Examiner* — Nhi Q Bui
(74) *Attorney, Agent, or Firm* — Schwegman Lundberg & Woessner, P.A.

(57) ABSTRACT

A method of operating a mobile cleaning robot in an environment can include detecting, such as using an optical stream from the mobile cleaning robot, a seasonal object located in the environment. A seasonal cleaning zone can be created based on the detected seasonal object when a current date is within a specified date range. The seasonal cleaning zone can be displayed on a map of the environment.

22 Claims, 12 Drawing Sheets

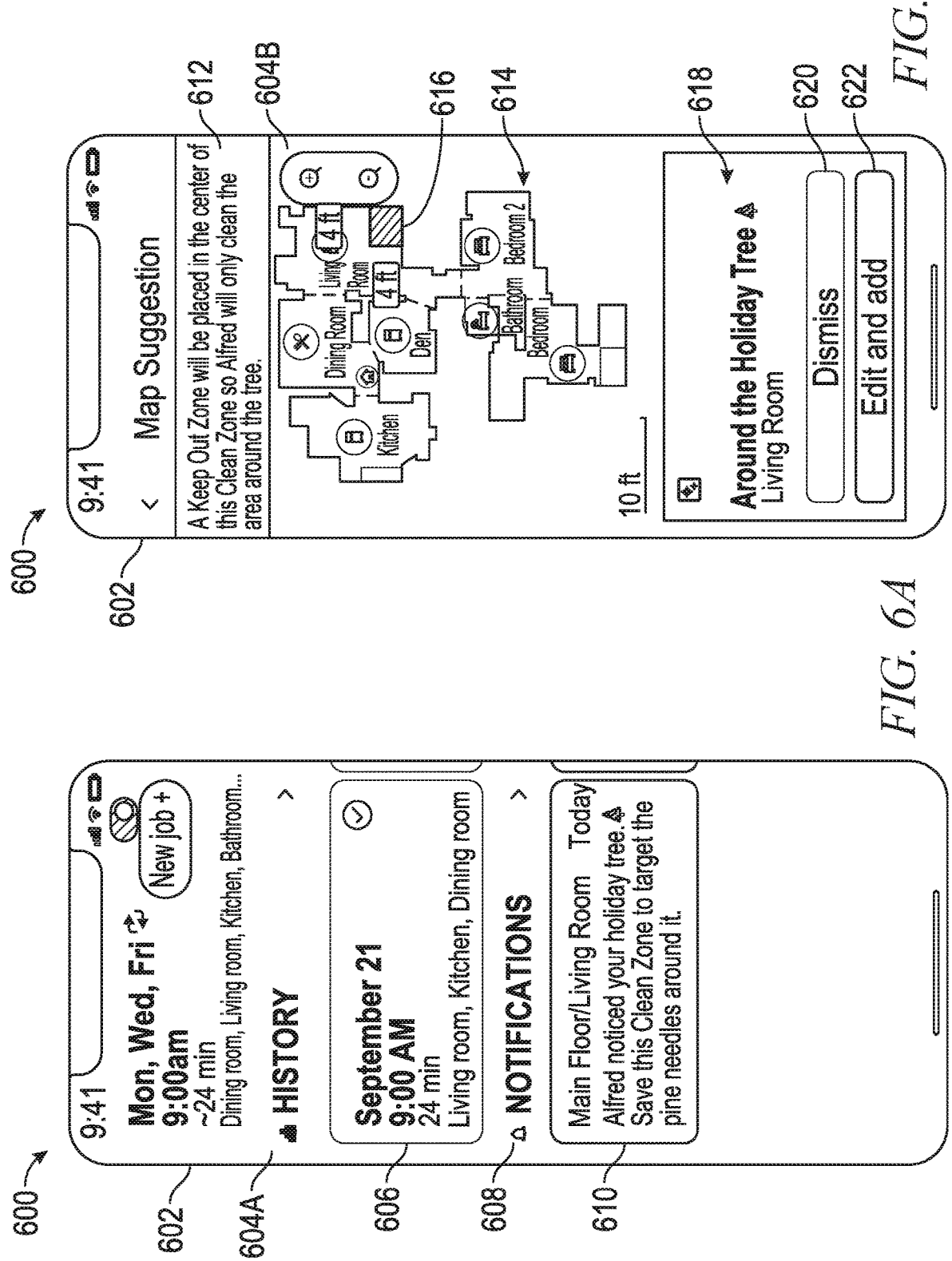

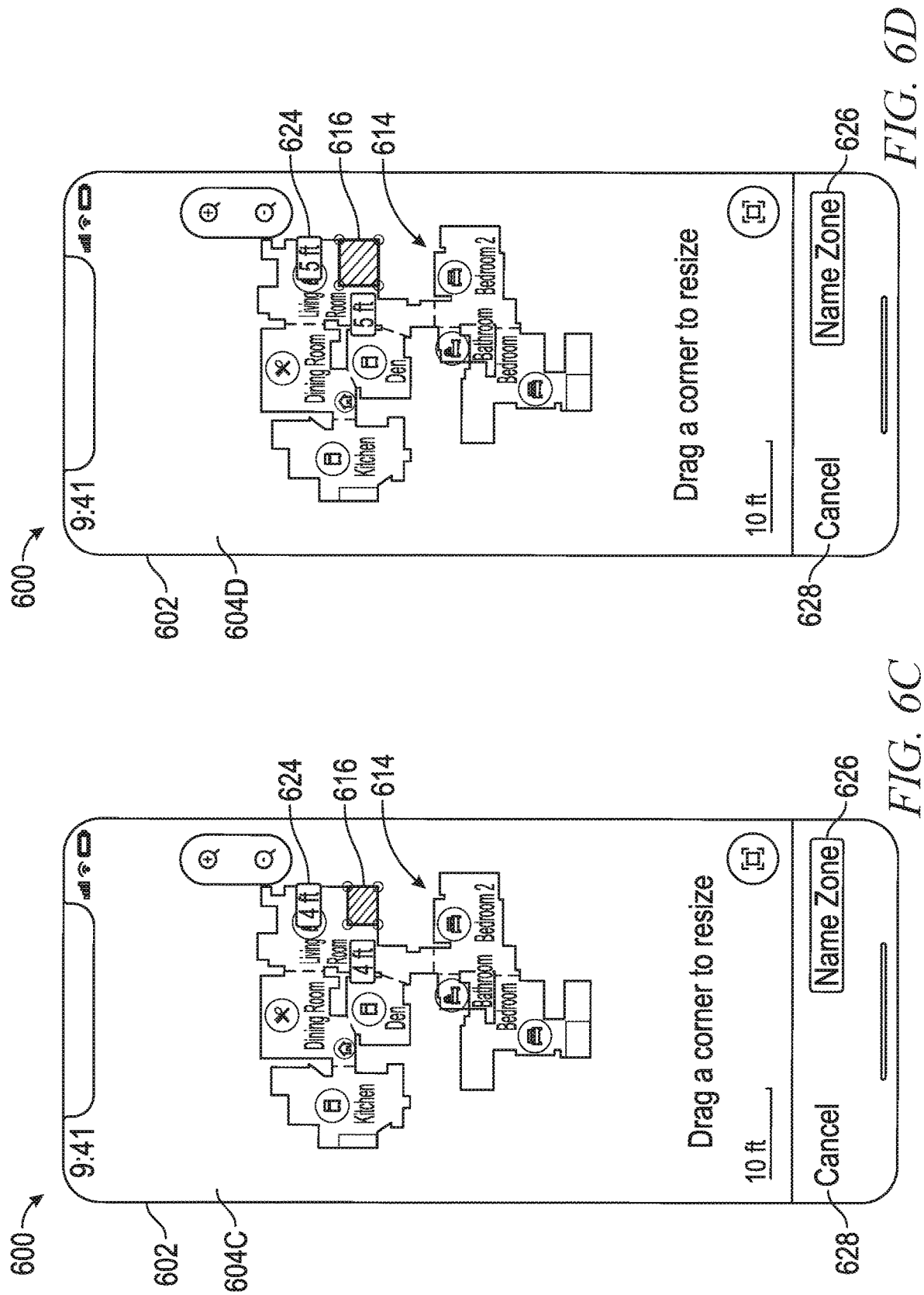

SEASONAL CLEANING ZONES FOR MOBILE CLEANING ROBOT

BACKGROUND

Autonomous mobile robots can move about an environment and can perform functions and operations in a variety of categories, including but not limited to security operations, infrastructure or maintenance operations, navigation or mapping operations, inventory management operations, and robot/human interaction operations. Some mobile robots, known as cleaning robots, can perform cleaning tasks autonomously within an environment, such as a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

SUMMARY

Mobile cleaning robots can be used by users, such as homeowners, to perform ad hoc or scheduled cleaning missions. During missions, robots can autonomously navigate the environment and perform cleaning operations, such as vacuuming. During navigation and cleaning, a robot can use its camera to detect objects within the environment, such as for odometry, avoidance, or scene understanding. This detection can help the robot to perform better cleaning operations, make and use a map of the environment, and avoid ingestion of non-debris items. These visual processes can also be used to detect other objects in an environment where the detected objects can be used by the robot and the user to modify the map of the environment and to guide cleaning missions, such as through avoidance of problematic obstacles. However, some items in a household or environment may be added to an environment after the map is generated where the objects need additional cleaning attention or considerations. For example, holiday trees can drop needles, requiring additional cleaning frequency or passes. However, holiday trees are often only kept in place for about one month of the year, making a permanent object modification to the map an undesirable solution.

This disclosure can help to address these issues by discussing devices and methods for detecting seasonal items and creating a seasonal cleaning zone for such items. For example, the robot can detect holiday or seasonal items within an environment such as a holiday tree or Christmas tree. Once detected, the robot can communicate the detection and location with a mobile device or remote server where the detection can be confirmed. A seasonal cleaning zone can be created and presented to a user for confirmation and creation of the seasonal cleaning zone within a map. A seasonal keep out zone can also optionally be created. The map can be updated and the robot can use the updated map in future missions to modify its cleaning behavior (which can be prescribed by the user) to clean the seasonal cleaning zone appropriately. Then, when the season ends or when the robot detects tree removal, the user can be prompted to remove the seasonal cleaning zone, allowing the robot to perform its missions in the area as it did previously.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6A illustrates a user interface of a handheld device.
FIG. 6B illustrates a user interface of a handheld device.
FIG. 6C illustrates a user interface of a handheld device.
FIG. 6D illustrates a user interface of a handheld device.

DETAILED DESCRIPTION

Figure 1:
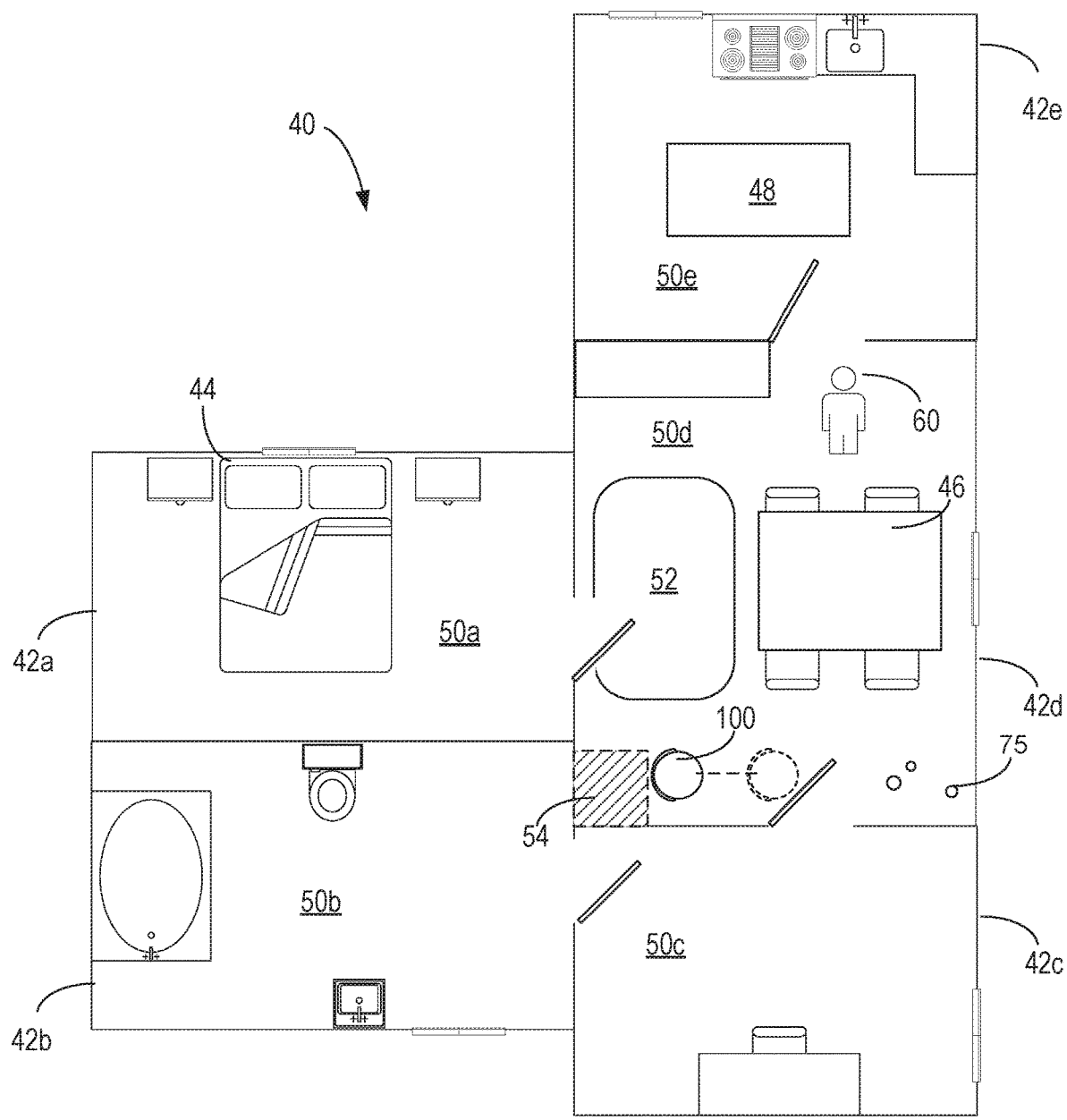
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42*a*-42*e*. Obstacles, such as a bed 44, a table 46, and an island 48 can be located in the rooms 42 of the environment. Each of the rooms 42*a*-42*e* can have a floor surface 50*a*-50*e*, respectively. Some rooms, such as the room 42*d*, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50*a* of one room, such as the room 42*a*, before moving to the next room, such as the room 42*d*, to clean the surface of the room 42*d*. Different rooms can have different types of floor surfaces. For example, the room 42*e* (which can be a kitchen) can have a hard floor surface, such as wood or ceramic tile, and the room 42*a* (which can be a bedroom) can have a carpet surface, such as a medium pile carpet. Other rooms, such as the room 42*d*

(which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot or another device. The robot 100 can update the map (or data related thereto) such as to include or account for surface types of the floor surfaces 50a-50e of each of the respective rooms 42 of the environment. In some examples, the map can be updated to show the different surface types such as within each of the rooms 42.

In some examples, the user 60 can define a behavior control zone 54 using, for example, the methods and systems described herein. In response to the user 60 defining the behavior control zone 54, the robot 100 can move toward the behavior control zone 54 to confirm the selection. After confirmation, autonomous operation of the robot 100 can be initiated. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Components of the Robot

Figure 2A:
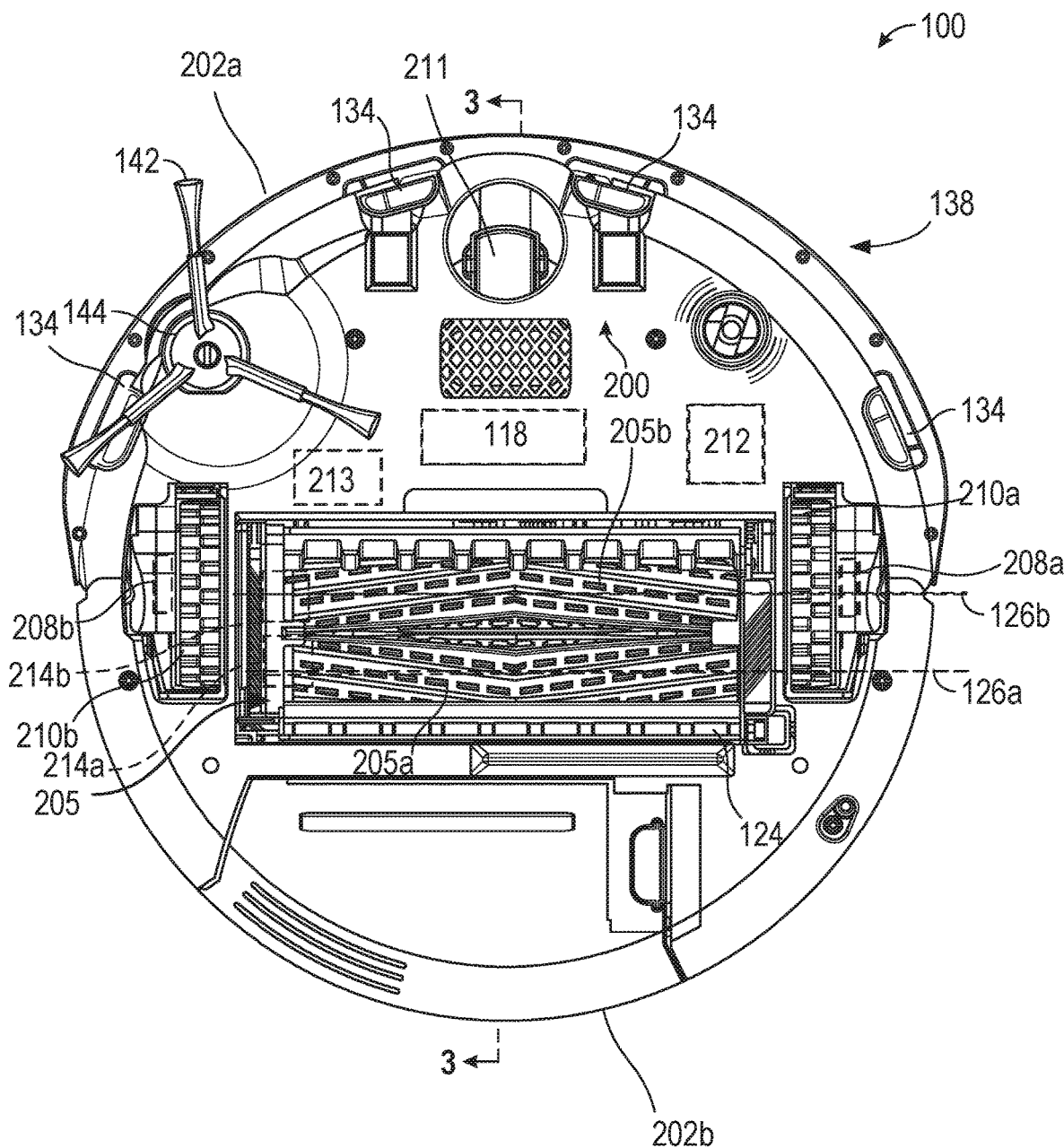
FIG. 2A illustrates a bottom view of a mobile cleaning robot.
Figure 2B:
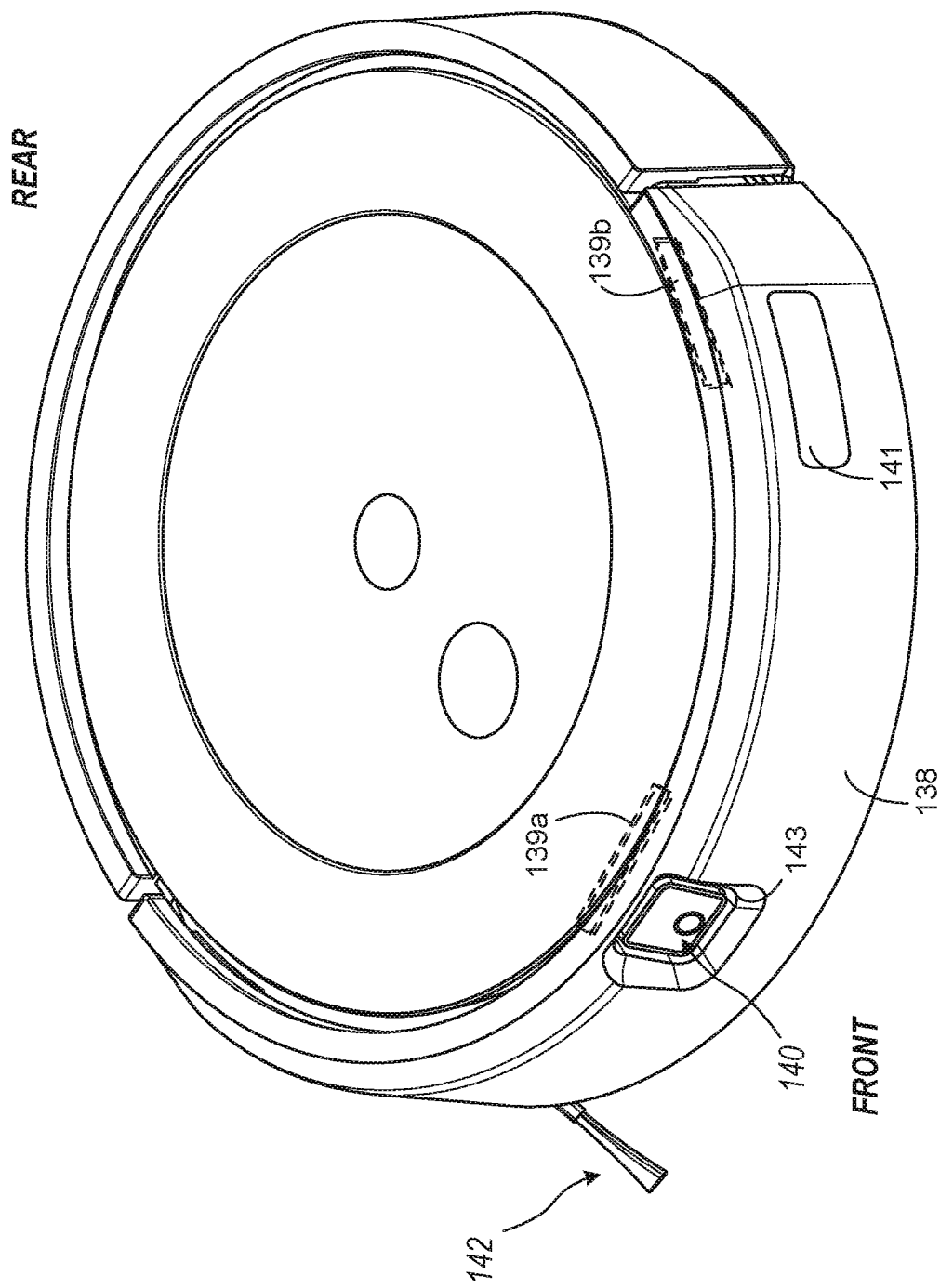
FIG. 2B illustrates an isometric view of a mobile cleaning robot.
Figure 3:
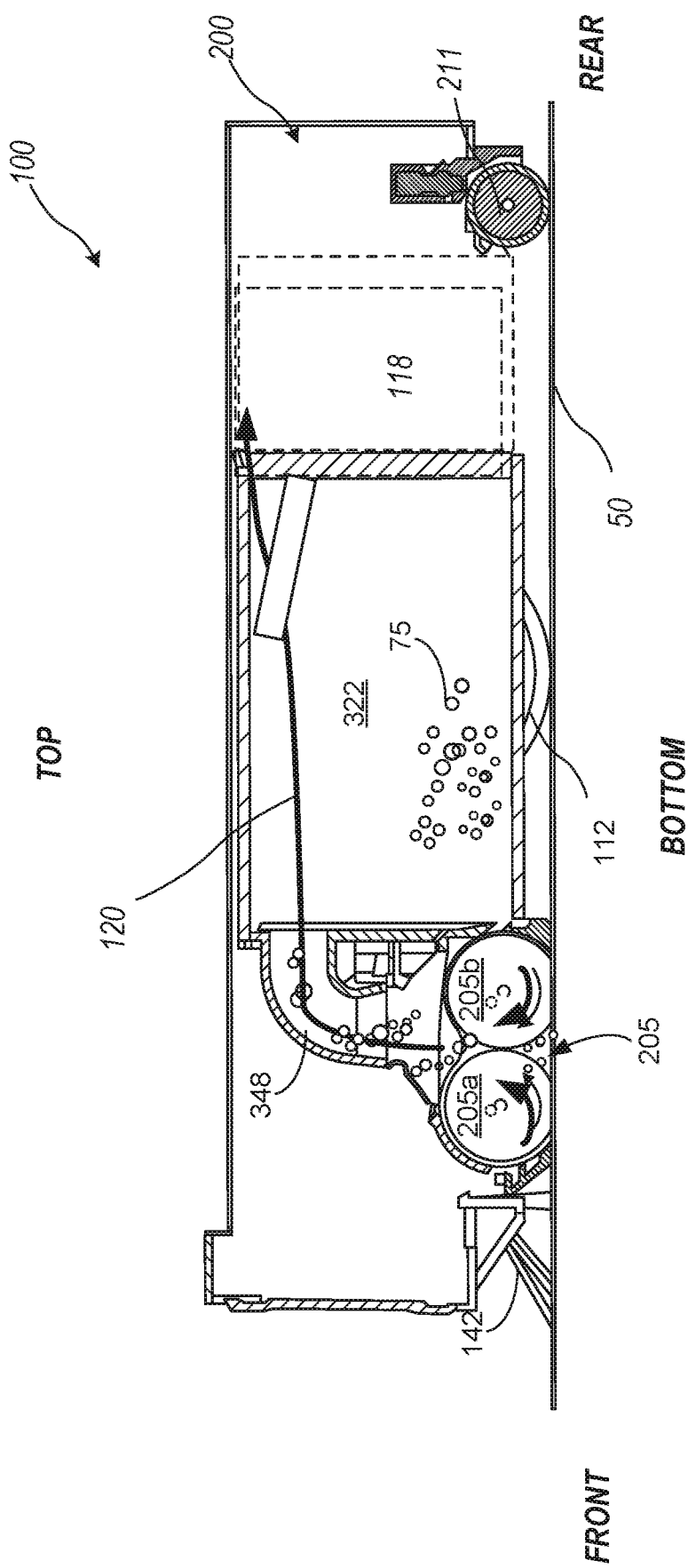
FIG. 3 illustrates a cross-section view across indicators 3-3 of FIG. 2A of a mobile cleaning robot.

FIG. 2A illustrates a bottom view of the mobile cleaning robot 100. FIG. 2B illustrates a bottom view of the mobile cleaning robot 100. FIG. 3 illustrates a cross-section view across indicators 3-3 of FIG. 2A of the mobile cleaning robot 100. FIG. 3 also shows orientation indicators Bottom, Top, Front, and Rear. FIGS. 2A-3 are discussed together below.

The cleaning robot 100 can be an autonomous cleaning robot that autonomously traverses the floor surface 50 while ingesting the debris 75 from different parts of the floor surface 50. As depicted in FIGS. 2A and 3, the robot 100 can include a body 200 movable across the floor surface 50. The body 200 can include multiple connected structures to which movable components of the cleaning robot 100 are mounted. The connected structures can include, for example, an outer housing to cover internal components of the cleaning robot 100, a chassis to which drive wheels 210a and 210b and the cleaning rollers 205a and 205b (of a cleaning assembly 205) are mounted, a bumper 138 mounted to the outer housing, etc.

As shown in FIG. 2A, the body 200 can include a front portion 202a that has a substantially semicircular shape and a rear portion 202b that has a substantially semicircular shape. As shown in FIG. 2A, the robot 100 can include a drive system including actuators 208a and 208b, e.g., motors, operable with drive wheels 210a and 210b. The actuators 208a and 208b can be mounted in the body 200 and can be operably connected to the drive wheels 210a and 210b, which are rotatably mounted to the body 200. The drive wheels 210a and 210b support the body 200 above the floor surface 50. The actuators 208a and 208b, when driven, can rotate the drive wheels 210a and 210b to enable the robot 100 to autonomously move across the floor surface 50.

The controller 212 can be located within the housing and can be a programmable controller, such as a single or multi-board computer, a direct digital controller (DDC), a programmable logic controller (PLC), or the like. In other examples the controller 212 can be any computing device, such as a handheld computer, for example, a smart phone, a tablet, a laptop, a desktop computer, or any other computing device including a processor, memory, and communication capabilities. The memory 213 can be one or more types of memory, such as volatile or non-volatile memory, read-only memory (ROM), random-access memory (RAM), magnetic disk storage media, optical storage media, flash-memory devices, and other storage devices and media. The memory 213 can be located within the housing 200, connected to the controller 212 and accessible by the controller 212.

The controller 212 can operate the actuators 208a and 208b to autonomously navigate the robot 100 about the floor surface 50 during a cleaning operation. The actuators 208a and 208b are operable to drive the robot 100 in a forward drive direction, in a backwards direction, and to turn the robot 100. The robot 100 can include a caster wheel 211 that supports the body 200 above the floor surface 50. The caster wheel 211 can support the rear portion 202b of the body 200 above the floor surface 50, and the drive wheels 210a and 210b support the front portion 202a of the body 200 above the floor surface 50.

As shown in FIG. 3, a vacuum assembly 118 can be carried within the body 200 of the robot 100, e.g., in the front portion 202a of the body 200. The controller 212 can operate the vacuum assembly 118 to generate an airflow that flows through the air gap near the cleaning rollers 205, through the body 200, and out of the body 200. The vacuum assembly 118 can include, for example, an impeller that generates the airflow when rotated. The airflow and the cleaning rollers 205, when rotated, cooperate to ingest debris 75 into the robot 100. A cleaning bin 322 mounted in the body 200 contains the debris 75 ingested by the robot 100, and a filter in the body 200 separates the debris 75 from the airflow before the airflow 120 enters the vacuum assembly 118 and is exhausted out of the body 200. In this regard, the debris 75 is captured in both the cleaning bin 322 and the filter before the airflow 120 is exhausted from the body 200.

The cleaning rollers 205a and 205b can operably connected to actuators 214a and 214b, e.g., motors, respectively. The cleaning head 205 and the cleaning rollers 205a and 205b can positioned forward of the cleaning bin 322. The cleaning rollers 205a and 205b can be mounted to a housing 124 of the cleaning head 205 and mounted, e.g., indirectly or directly, to the body 200 of the robot 100. In particular, the cleaning rollers 205a and 205b are mounted to an underside of the body 200 so that the cleaning rollers 205a and 205b engage debris 75 on the floor surface 50 during the cleaning operation when the underside faces the floor surface 50.

The housing 124 of the cleaning head 205 can be mounted to the body 200 of the robot 100. In this regard, the cleaning rollers 205a and 205b are also mounted to the body 200 of the robot 100, e.g., indirectly mounted to the body 200 through the housing 124. Alternatively, or additionally, the cleaning head 205 is a removable assembly of the robot 100 in which the housing 124 with the cleaning rollers 205a and 205b mounted therein is removably mounted to the body 200 of the robot 100. The housing 124 and the cleaning rollers 205a and 205b are removable from the body 200 as a unit so that the cleaning head 205 is easily interchangeable with a replacement cleaning head 205.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50.

Cliff sensors 134 (shown in FIG. 2A) can be located along a bottom portion of the housing 200. Each of the cliff sensors 134 can be an optical sensor that can be configured to detect a presence or absence of an object below the optical sensor, such as the floor surface 50. The cliff sensors 134 can be connected to the controller 212. A bumper 138 can be removably secured to the body 200 and can be movable relative to body 200 while mounted thereto. In some examples, the bumper 138 form part of the body 200. The bump sensors 139a and 139b (the bump sensors 139) can be connected to the body 200 and engageable or configured to interact with the bumper 138. The bump sensors 139 can include break beam sensors, capacitive sensors, switches, or other sensors that can detect contact between the robot 100, i.e., the bumper 138, and objects in the environment 40. The bump sensors 139 can be in communication with the controller 212.

An image capture device 140 can be connected to the body 200 and can extend through the bumper 138 of the robot 100, such as through an opening 143 of the bumper 138. The image capture device 140 can be a camera, such as a front-facing camera, configured to generate a signal based on imagery of the environment 40 of the robot 100 as the robot 100 moves about the floor surface 50. The image capture device 140 can transmit the signal to the controller 212 for use for navigation and cleaning routines.

Obstacle following sensors 141 (shown in FIG. 2B) can include an optical sensor facing outward from the bumper 138 and that can be configured to detect the presence or the absence of an object adjacent to a side of the body 200. The obstacle following sensor 141 can emit an optical beam horizontally in a direction perpendicular (or nearly perpendicular) to the forward drive direction of the robot 100. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

A side brush 142 can be connected to an underside of the robot 100 and can be connected to a motor 144 operable to rotate the side brush 142 with respect to the body 200 of the robot 100. The side brush 142 can be configured to engage debris to move the debris toward the cleaning assembly 205 or away from edges of the environment 40. The motor 144 configured to drive the side brush 142 can be in communication with the controller 112. The brush 142 can rotate about a non-horizontal axis, e.g., an axis forming an angle between 75 degrees and 90 degrees with the floor surface 50. The non-horizontal axis, for example, can form an angle between 75 degrees and 90 degrees with the longitudinal axes 126a and 126b of the rollers 205a and 205b.

The brush 142 can be a side brush laterally offset from a center of the robot 100 such that the brush 142 can extend beyond an outer perimeter of the body 200 of the robot 100. Similarly, the brush 142 can also be forwardly offset of a center of the robot 100 such that the brush 142 also extends beyond the bumper 138.

Operation of the Robot

In operation of some examples, the robot 100 can be propelled in a forward drive direction or a rearward drive direction. The robot 100 can also be propelled such that the robot 100 turns in place or turns while moving in the forward drive direction or the rearward drive direction.

When the controller 212 causes the robot 100 to perform a mission, the controller 212 can operate the motors 208 to drive the drive wheels 210 and propel the robot 100 along the floor surface 50. In addition, the controller 212 can operate the motors 208 to cause the rollers 205a and 205b to rotate, can operate the motor 144 to cause the brush 142 to rotate, and can operate the motor of the vacuum system 118 to generate airflow. The controller 212 can execute software stored on the memory 213 to cause the robot 100 to perform various navigational and cleaning behaviors by operating the various motors of the robot 100.

The various sensors of the robot 100 can be used to help the robot navigate and clean within the environment 40. For example, the cliff sensors 134 can detect obstacles such as drop-offs and cliffs below portions of the robot 100 where the cliff sensors 134 are disposed. The cliff sensors 134 can transmit signals to the controller 212 so that the controller 212 can redirect the robot 100 based on signals from the cliff sensors 134.

In some examples, a bump sensor 139a can be used to detect movement of the bumper 138 along a fore-aft axis of the robot 100. A bump sensor 139b can also be used to detect movement of the bumper 138 along one or more sides of the robot 100. The bump sensors 139 can transmit signals to the controller 212 so that the controller 212 can redirect the robot 100 based on signals from the bump sensors 139.

The image capture device 140 can be configured to generate a signal based on imagery of the environment 40 of the robot 100 as the robot 100 moves about the floor surface 50. The image capture device 140 can transmit such a signal to the controller 212. The image capture device 140 can be angled in an upward direction, e.g., angled between 5 degrees and 45 degrees from the floor surface 50 about which the robot 100 navigates. The image capture device 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system can include an obstacle following sensor along a side surface, and the obstacle following sensor can detect the presence or the absence an object adjacent to the side surface. The one or more obstacle following sensors 141 can also serve as obstacle detection sensors, similar to the proximity sensors described herein.

The robot 100 can also include sensors for tracking a distance travelled by the robot 100. For example, the sensor system can include encoders associated with the motors 208 for the drive wheels 210, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and the controller 212 can determine a distance travelled by the robot 100 based on the signal based on changes in floor features as the robot 100 travels along the floor surface 50.

The controller 212 can use data collected by the sensors of the sensor system to control navigational behaviors of the robot 100 during the mission. For example, the controller 212 can use the sensor data collected by obstacle detection sensors of the robot 100, (the cliff sensors 134, the bump sensors 139, and the image capture device 140) to enable the robot 100 to avoid obstacles within the environment of the robot 100 during the mission.

The sensor data can also be used by the controller 212 for simultaneous localization and mapping (SLAM) techniques in which the controller 212 extracts features of the environment represented by the sensor data and constructs a map of the floor surface 50 of the environment. The sensor data collected by the image capture device 140 can be used for techniques such as vision-based SLAM (VSLAM) in which the controller 212 extracts visual features corresponding to objects in the environment 40 and constructs the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission can include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently clean the floor surface 50. For example, the map enables the controller 212 to direct the robot 100 toward open floor space and to avoid non-traversable space. In addition, for subsequent missions, the controller 212 can use the map to optimize paths taken during the missions to help plan navigation of the robot 100 through the environment 40.

Network Examples

Figure 4A:
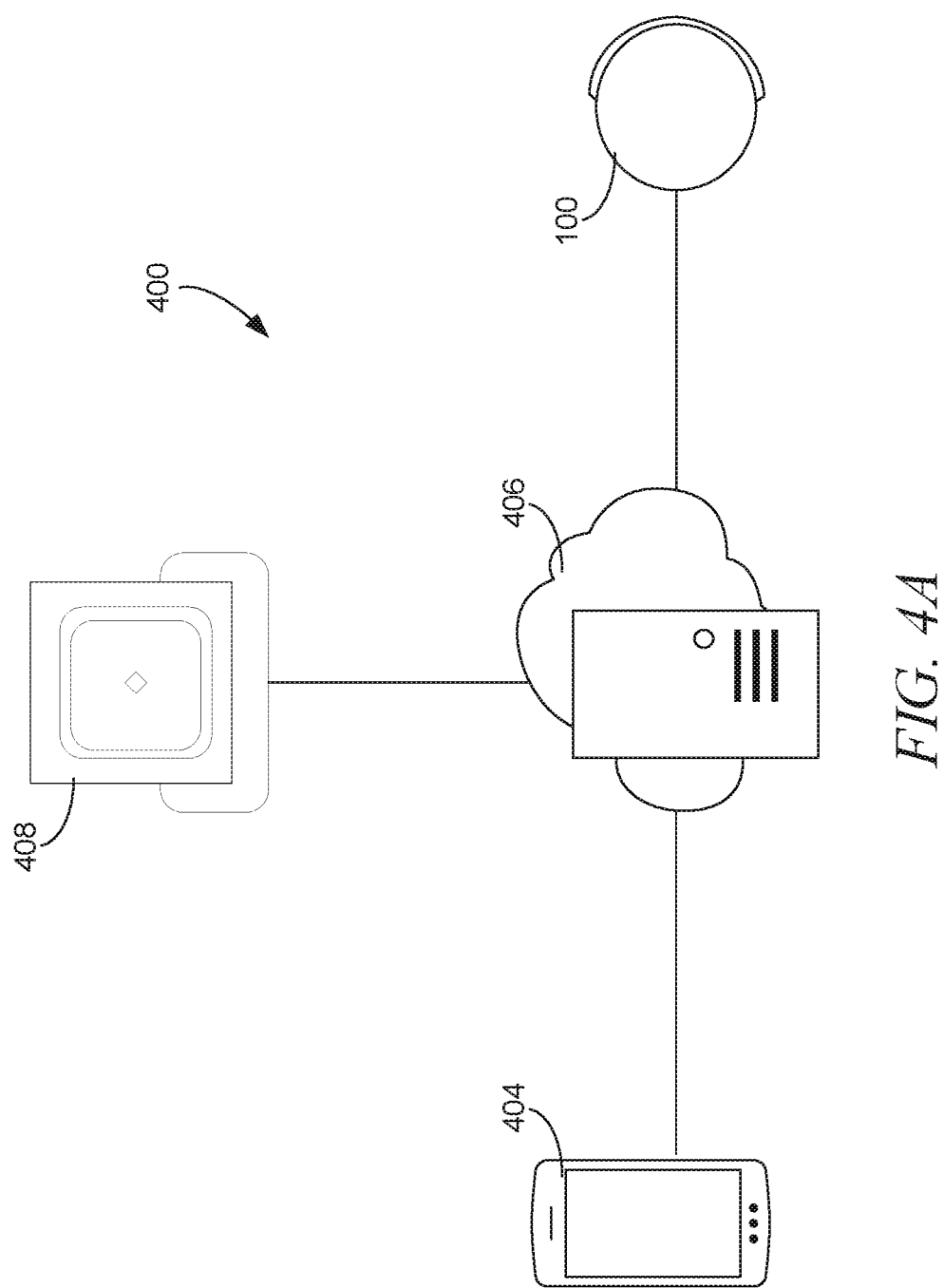
FIG. 4A illustrates a diagram illustrating an example of a communication network in which a mobile cleaning robot operates and data transmission in the network.

FIG. 4A is a diagram illustrating an example of a communication network 400 that can enable networking between the mobile robot 100 and one or more other devices, such as a mobile device 404, a cloud computing system 406, or another autonomous robot 408 separate from the mobile robot 404. Using the communication network 410, the robot 100, the mobile device 404, the robot 408, and the cloud computing system 406 can communicate with one another to transmit and receive data from one another. In some examples, the robot 100, the robot 408, or both the robot 100 and the robot 408 communicate with the mobile device 404 through the cloud computing system 406. Alternatively, or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks) can be employed by the communication network 410.

In some examples, the mobile device 404 can be a remote device that can be linked to the cloud computing system 406 and can enable a user to provide inputs. The mobile device 404 can include user input elements such as, for example, one or more of a touchscreen display, buttons, a microphone, a mouse, a keyboard, or other devices that respond to inputs provided by the user. The mobile device 404 can also include immersive media (e.g., virtual reality) with which the user can interact to provide input. The mobile device 404, in these examples, can be a virtual reality headset or a head-mounted display.

The user can provide inputs corresponding to commands for the mobile robot 404. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 can be a smart phone, a laptop computer, a tablet computing device, or other mobile device.

According to some examples discussed herein, the mobile device 404 can include a user interface configured to display a map of the robot environment. A robot path, such as that identified by a coverage planner, can also be displayed on the map. The interface can receive a user instruction to modify the environment map, such as by adding, removing, or otherwise modifying a keep-out zone in the environment; adding, removing, or otherwise modifying a focused cleaning zone in the environment (such as an area that requires repeated cleaning); restricting a robot traversal direction or traversal pattern in a portion of the environment; or adding or changing a cleaning rank, among others.

In some examples, the communication network 410 can include additional nodes. For example, nodes of the communication network 410 can include additional robots. Also, nodes of the communication network 410 can include network-connected devices that can generate information about the environment 40. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 410, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Figure 4B:
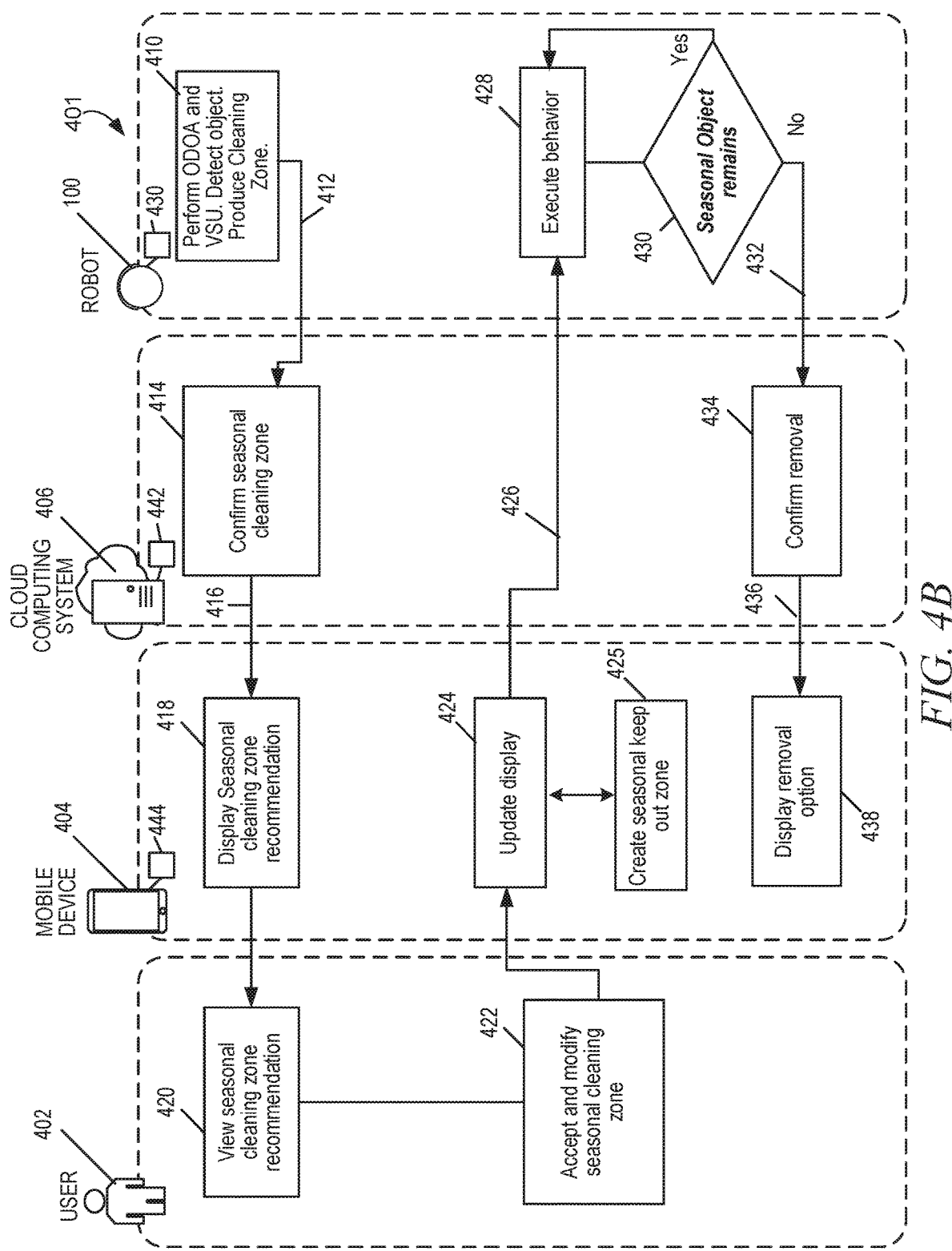
FIG. 4B illustrates a diagram illustrating an exemplary process of exchanging information between the mobile robot and other devices in a communication network.

FIG. 4B is a diagram illustrating an exemplary process 401 of exchanging information among devices in the communication network 410, including the mobile robot 100, the cloud computing system 406, and the mobile device 404.

In operation of some examples, a cleaning mission can be initiated by pressing a button on the mobile robot 100 (or the mobile device 404) or can be scheduled for a future time or day. The user can select a set of rooms to be cleaned during the cleaning mission or can instruct the robot to clean all rooms. The user can also select a set of cleaning parameters to be used in each room during the cleaning mission.

During a cleaning mission, the mobile robot 100 can perform obstacle detection and avoidance (ODOA) and visual scene understanding (VSU) 410 as it traverses an environment. The robot 100 can also perform visual simultaneous localization and mapping (VSLAM). VSLAM can be performed by the robot 100 by using an optical stream produced by the image capture device 140 and can be used by the robot 100 to compare features that are detected from frame to frame in order to build or update a map of its environment (such as the environment 40) and to localize the robot 100 within the environment 40. On the other hand, ODOA can be performed using the optical stream and can be used to detect obstacles that lie in the path of the robot, so ODOA analysis can view objects below the horizon and as close to the front of the robot as possible. VSU can be performed by analyzing the optical stream using all or most of the frame for understanding or interpreting objects within an environment, which can also be used for mapping or localization. These components and processes can be used together to perform one or more cleaning missions, where the missions can be modifiable by the user.

For example, at 410, the robot 100 can use one or more optical processes to determine whether a seasonal object is located within the environment. For example, the robot can use VSU to determine that a holiday tree is present within the environment and can use one or more of VO, ODOA, or VSLAM to determine the location of the seasonal item within the environment and on the map. The robot 100 can also reference a date range to determine if a current date is within a determined or specified date range. For example, for a holiday tree, a specified date range can be between November $25^{th}$ and January $2^{nd}$. If the current date is within the specified date range, the robot 100 can produce, create, or recommend a seasonal cleaning zone. The robot 100 can use the determined location of the seasonal item to place the seasonal cleaning zone within the environment.

The robot 100 can also reference a geographic location of the robot 100. The robot 100 can use the geographic location of the robot 100 to determine whether to create the seasonal cleaning zone, such as within a date range that is dependent on the geographic location. For example, the robot 100 can determine that the robot is in North America to determine a date range for the seasonal item that is detected, such as a holiday tree. The date range in North America may be different date range than for Australia or South America. Optionally, a seasonal cleaning zone may not be recommended at all based on a detected geographic location. For example, if the geographic location is determined to be in China, a holiday tree cleaning zone may not be recommended. Optionally, users can be presented with a menu to opt into or out of seasonal decoration suggestions based on detection.

The mobile robot 100 can transmit 412 data (e.g., one or more of location data, operational event data, time data, etc.), the detection of the seasonal item, and the location of the seasonal cleaning zone to the cloud computing system 406. The cloud computing system 406 can use the transmitted information (optionally with other information) to determine 414, such as by a processor 442, whether the seasonal cleaning zone was created properly (e.g., whether the item detected is a holiday tree and whether the time range is correct).

Once the seasonal cleaning zone is confirmed by the cloud computing system 406, the cloud computing system 406 can transmit 416 approval or confirmation of the seasonal object and the seasonal cleaning zone to the mobile cleaning robot 100 or mobile device 404. The mobile device 404, such as using a processor 444 thereof, can produce an alert or notification that a seasonal item (e.g., holiday tree) has been detected and the recommended seasonal cleaning zone at 418. At 420, the user 402 can view the recommendation and at 422 the user can accept or modify (or reject) the seasonal cleaning zone. For example, the user can adjust a location or size of the cleaning zone on a map. The mobile device 404 can receive the adjustments from the user 402 to the size or location of the cleaning zone through the user interface. During this process, the mobile device 404 can update the display at 424 to reflect changes of the cleaning zone on the map of the environment.

Optionally, at 425 a seasonal keep out zone can be created within the seasonal cleaning zone and the display can be updated to show the seasonal keep out zone on the map of the environment. Optionally, the seasonal keep out zone can be created at the same time as the seasonal cleaning zone. Then, optionally, the mobile device 404 can receive, such as from the user 402 an adjustment to the seasonal keep out zone and can update the seasonal keep out zone on the map based on the received adjustment. Optionally, the user can be presented with an option to remove the seasonal keep out zone, such as when a date is outside the seasonal date range. Once the seasonal cleaning zone (and optionally the seasonal keep out zone) is finalized and accepted, the information can be transmitted at 426 to the robot 100 for use in the next mission. During the next mission, the robot 100 can perform cleaning in the seasonal cleaning zone and optionally can avoid the seasonal keep out zone at 428. For example, the robot 100 can perform additional cleaning passes in the seasonal cleaning zone and can navigate around the seasonal keep out zone.

At 430, the robot 100 can determine, such as during one or more missions, whether the seasonal object remains. If the object remains, the robot 100 can perform the seasonal behavior. If the object does not remain, the robot 100 can transmit 432 detection of removal from the environment to the cloud computing system 406 where the cloud computing system 406 can use the transmitted data from the robot 100 to confirm that the seasonal item has been removed at 434. Once the cloud computing system 406 confirms removal, the removal can be transmitted 436 to the mobile device 404 where the mobile device 404 can display a notification or message for the user to remove the seasonal cleaning zone or keep out zone from the environment at 438. Optionally, the removal option can be produced based on a predetermined time frame. For example, if the current date is outside the November $25^{th}$ to January $2^{nd}$ window or time period, the mobile device 404 can produce an alert or notification for the user to remove the seasonal cleaning zone or keep out zone from the environment at 438.

Operations for the process 401 and other processes described herein, such one or more steps discussed with respect to FIGS. 4A-6H can be executed in a distributed manner. For example, the cloud computing system 406, the mobile robot 100, and the mobile device 404 can execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Robot Operation Examples

Figure 5A:
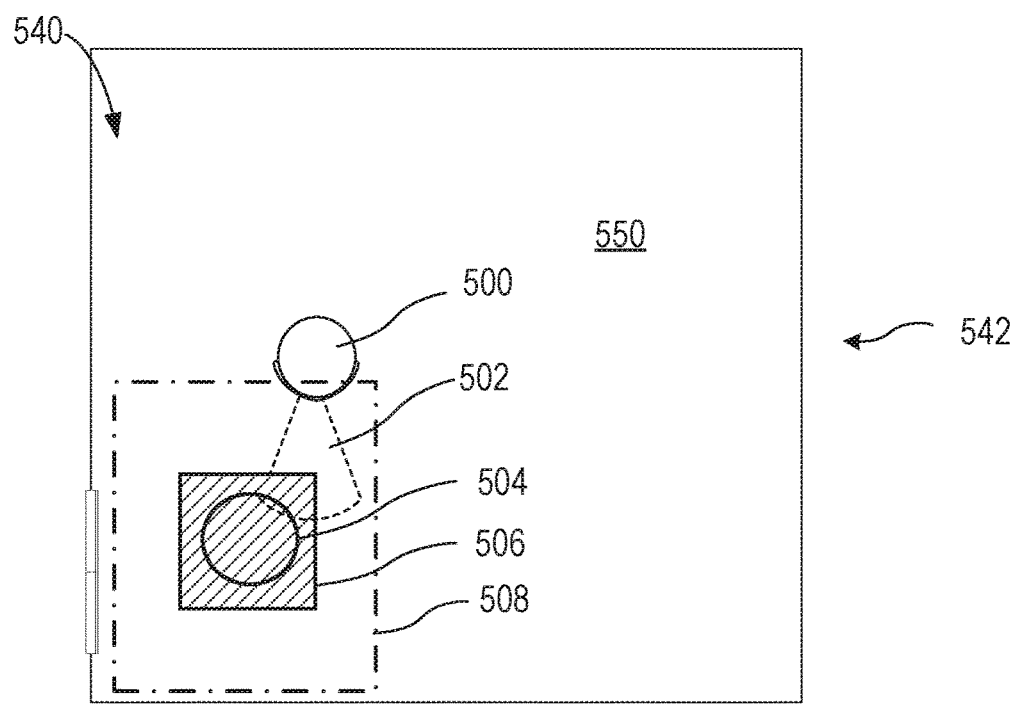
FIG. 5A illustrates a plan view of a mobile cleaning robot in an environment.
Figure 5B:
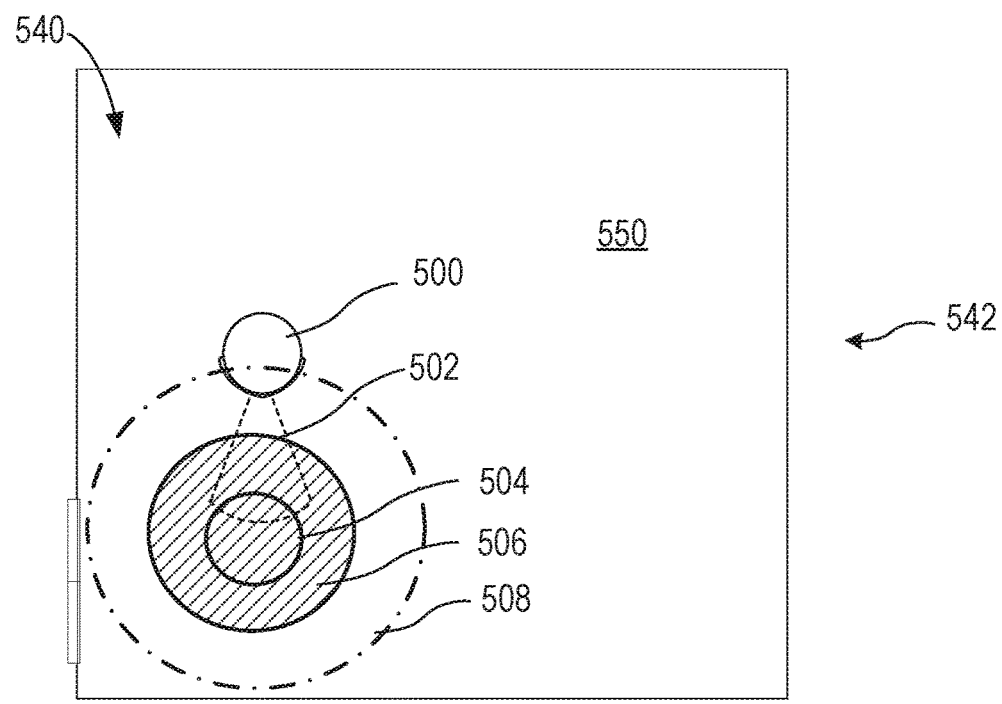
FIG. 5B illustrates a plan view of a mobile cleaning robot in an environment.

FIG. 5A illustrates a plan view of a mobile cleaning robot 500 in an environment 540. FIG. 5B illustrates a plan view of the mobile cleaning robot in the environment 540 under slightly different conditions. FIGS. 5A and 5B discuss how a robot can operate in an environment with regard to seasonal objects, and are discussed below.

The environment 540 can include a room 542, where the room 542 can include a floor surface 550. The environment 540 can be a portion of any of the environments discussed above. The mobile cleaning robot 500 can be similar to any of the robots discussed above and can produce a field of view 502 from a camera (such as the camera 140) of the robot 500. FIGS. 5A and 5B show a seasonal object 504, which can be a holiday tree (such as a Christmas tree), but can be other seasonal objects, such as candles, statues, plants, trees, or other seasonal decorations.

Processing circuitry in communication with (or within) the robot 500 and in communication with the camera of the robot 100 can be configured to produce an image output based on the optical field of view 502 of the camera. The processing circuitry can be configured to detect the seasonal object in the optical field of view 502 (such as using one or more of VSU, ODOA, or VSLAM techniques). Optionally, the robot 500 can be on a mission where the seasonal object 504 was previously detected by the robot 500, such as using the steps discussed above.

Once the object 504 is detected and confirmed, the robot 500 can receive a seasonal cleaning zone 508 and optionally a seasonal keep out zone 506. The cleaning zone 508 and the keep out zones can have rectangular shapes, as shown in FIG. 5A or circular shapes as shown in FIG. 5B. The seasonal keep out zone 506 can be a radius around the seasonal object 504 of, for example, 10 cm, 20 cm, 30 cm, 40 cm, 50 cm, 60 cm, 70 cm, 80 cm, 90 cm, 1 meter, or the like.

The zones can have other shapes, such as triangles, regular polygons, irregular polygons, or the like. Optionally, the seasonal cleaning zone 508 can have a first shape (e.g., circle) and the seasonal keep out zone 506 can have a second shape (e.g., rectangle). Optionally, a user can be presented with an option to select a shape for the seasonal keep out zone or the seasonal cleaning zone and the user can present a desired shape for the seasonal cleaning zone or the seasonal keep out zone.

When the robot determines (such as using VSLAM, a map of the environment, or the seasonal cleaning zone 508 and the seasonal keep out zone 506 on the map) that the robot 500 is in or near the seasonal cleaning zone 508, the robot 500 can modify its behavior according to predetermined instructions. For example, the robot 500 can avoid navigating through or into the seasonal keep out zone 506 or the seasonal object 504. The robot 500 can also increase a cleaning parameter in the seasonal cleaning zone 508 such as number of passes, robot speed through the seasonal cleaning zone 508, suction power through the seasonal cleaning zone 508, or the like, such as to more thoroughly or effectively clean the seasonal cleaning zone 508.

Because the seasonal cleaning zone 508 or the seasonal keep out zone 506 can move within the environment, the processing circuitry can optionally update a map or routine for the entire environment 540 based on a movement of the seasonal object 504. Optionally, when the robot 500 detects a significant move of the seasonal object 504 (such as a move to a different room of the environment), a notification can be produced by the mobile device 404 to ask the user if they would like to move or re-size the seasonal cleaning zone 508. The user can confirm the relocation of one or more of the seasonal object 504, the seasonal keep out zone 506, and the seasonal cleaning zone 508. Then, during operation of the robot 500, the processing circuitry can instruct the robot 500 to modify its behavior within the environment 540, based on the updated location of the seasonal object 504 within the environment 540.

The robot 500 can optionally detect other items using one or more of VSLAM, ODOA, or VSU related to the seasonal object 504. For example, the robot 500 can detect a tree skirt or presents (gifts). Detection of these or other items can be used by the robot 500 or other devices to modify the seasonal cleaning zone 508 or the seasonal keep out zone 506. For example, the seasonal keep out zone 506 can be sized to be at least as large as an area occupied by a tree skirt to help avoid ingestion of the tree skirt.

User Interface

FIGS. 6A-6G show a user interface of a device for displaying information to, and receiving input from, a user. Any of the devices discussed above or below can be configured to display the user interface of FIGS. 6A-6G. FIGS. 6A-6G are discussed together below.

FIG. 6A shows a first display 604A on a user interface 602 of a handheld device 600. The handheld device 600 can be a phone, tablet, mobile device, or the like, and can be any of the devices discussed above. The first display 604A can display shelves 606 and 610 and a notifications menu 608 under which the shelf 610 can be located. The shelf 610 can be, for example, a notification indicating that a seasonal item, such as a holiday tree, is detected. The shelf 610 can be produced following detection (and optionally confirmation of a holiday item within an environment as discussed above) and can be user-selectable to change the first display 604A displayed on the user interface 602 to a second display 604B.

FIG. 6B illustrates the second display 604B on the user interface 602 of the handheld device 600. The second display 604B can show a suggestion 612 to add a seasonal cleaning zone and can display a map 614 including a seasonal cleaning zone 616 in a location where the seasonal item is detected by the robot. The second display 604B can also show a shelf 618 including a cleaning zone suggestion where a dismiss indication 620 and an add indication 622 can be presented. Selection of the dismiss indication 620 can cancel addition of the seasonal cleaning zone and selection of the add indication 622 can cause the handheld device 600 to display the next screen or display 604C, as shown in FIG. 6C.

In the display 604C, the seasonal cleaning zone 616 can be adjusted. For example, a size indication 624 can show a size of the seasonal cleaning zone 616 and a user can use the display 604C to adjust a size of the seasonal cleaning zone 616 on the map 614. For example, as shown in FIG. 6C, the size indication 624 can be 4 feet wide and as shown in FIG. 6D, the size indication 624 can be increased to 5 feet wide. A length and width of the seasonal cleaning zone 616 can be adjusted by a user, as desired. Optionally, a seasonal keep out zone can be added using the same or similar steps. When the seasonal cleaning zone 616 is at an acceptable size the user can select name zone indication 626 or can alternatively cancel the addition using cancel indication 628. FIG. 6E shows a display 604E for naming or renaming the zone.

Figure 6F:
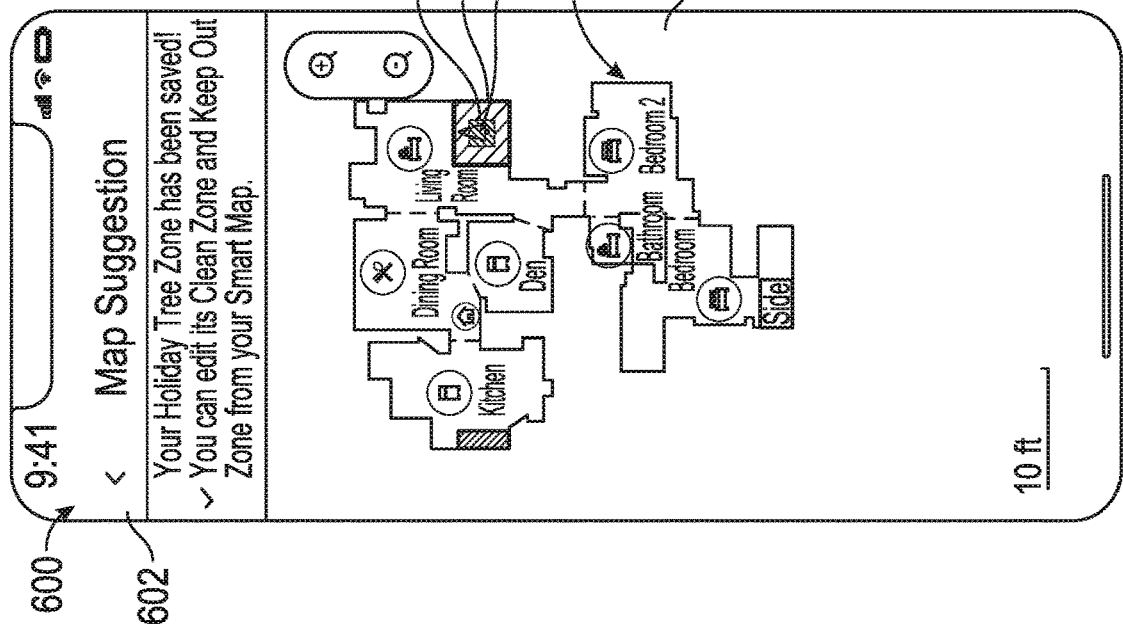
FIG. 6F illustrates a user interface of a handheld device.
Figure 6E:
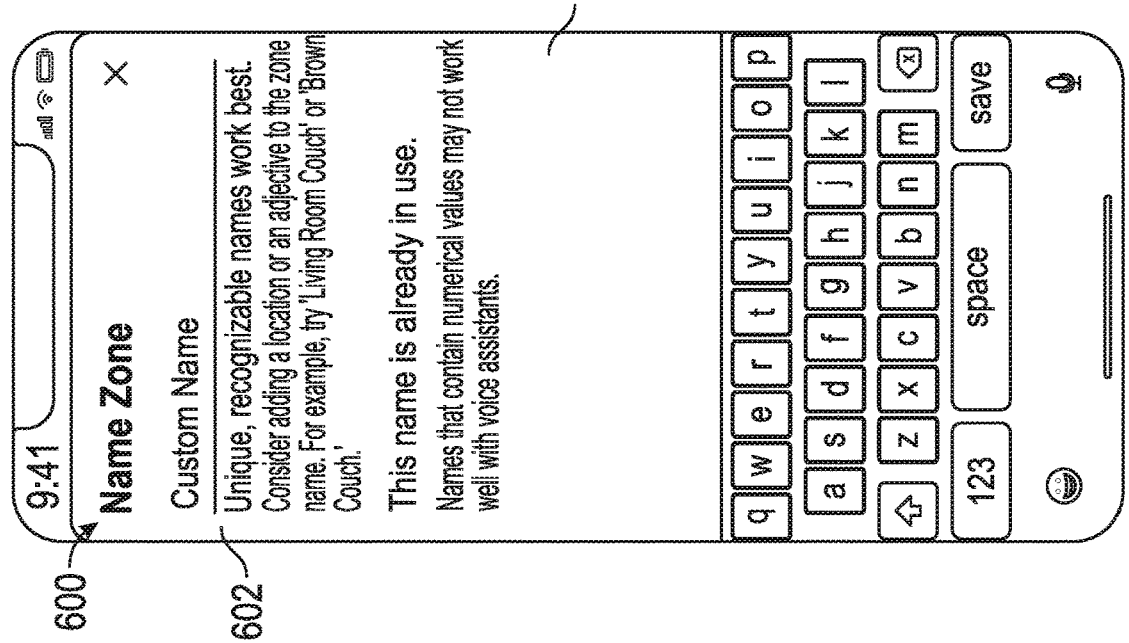
FIG. 6E illustrates a user interface of a handheld device.

FIG. 6F shows a display 604F showing the map with the seasonal cleaning zone 616 and a seasonal keep out zone 630 within the seasonal cleaning zone 616. The display 604F can also show a name or indication 632 of the seasonal keep out zone, which can be "Holiday Tree," or a holiday tree icon (emoji), as shown in FIG. 6F. The name displayed can be the name selected in the display 604E. Optionally, an icon of a tree can be shown on the map to indicate a location of the seasonal item (e.g., holiday tree) in the environment on the map 614.

Figure 6G:
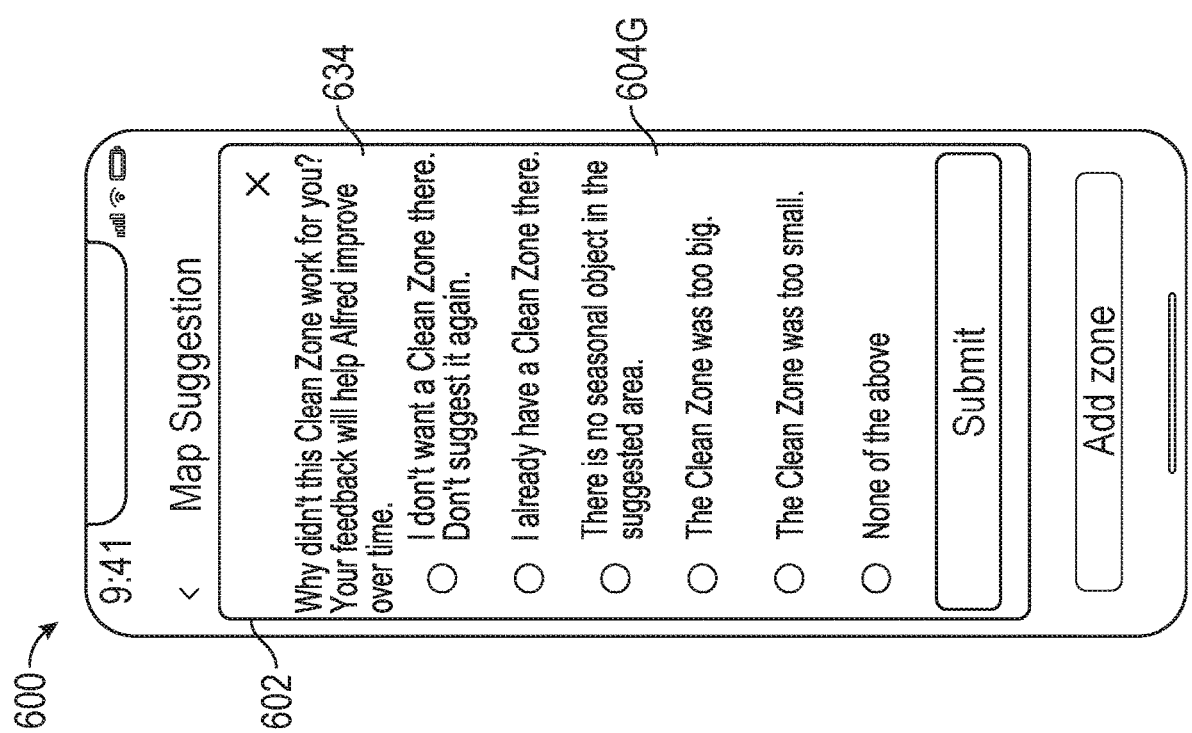
FIG. 6G illustrates a user interface of a handheld device.

FIG. 6G shows a display 604G on the user interface 602 including a shelf or card 634 including user-selectable options to explain why the seasonal cleaning zone was not added or desirable. Other options can be alternatively listed.

Figure 7:
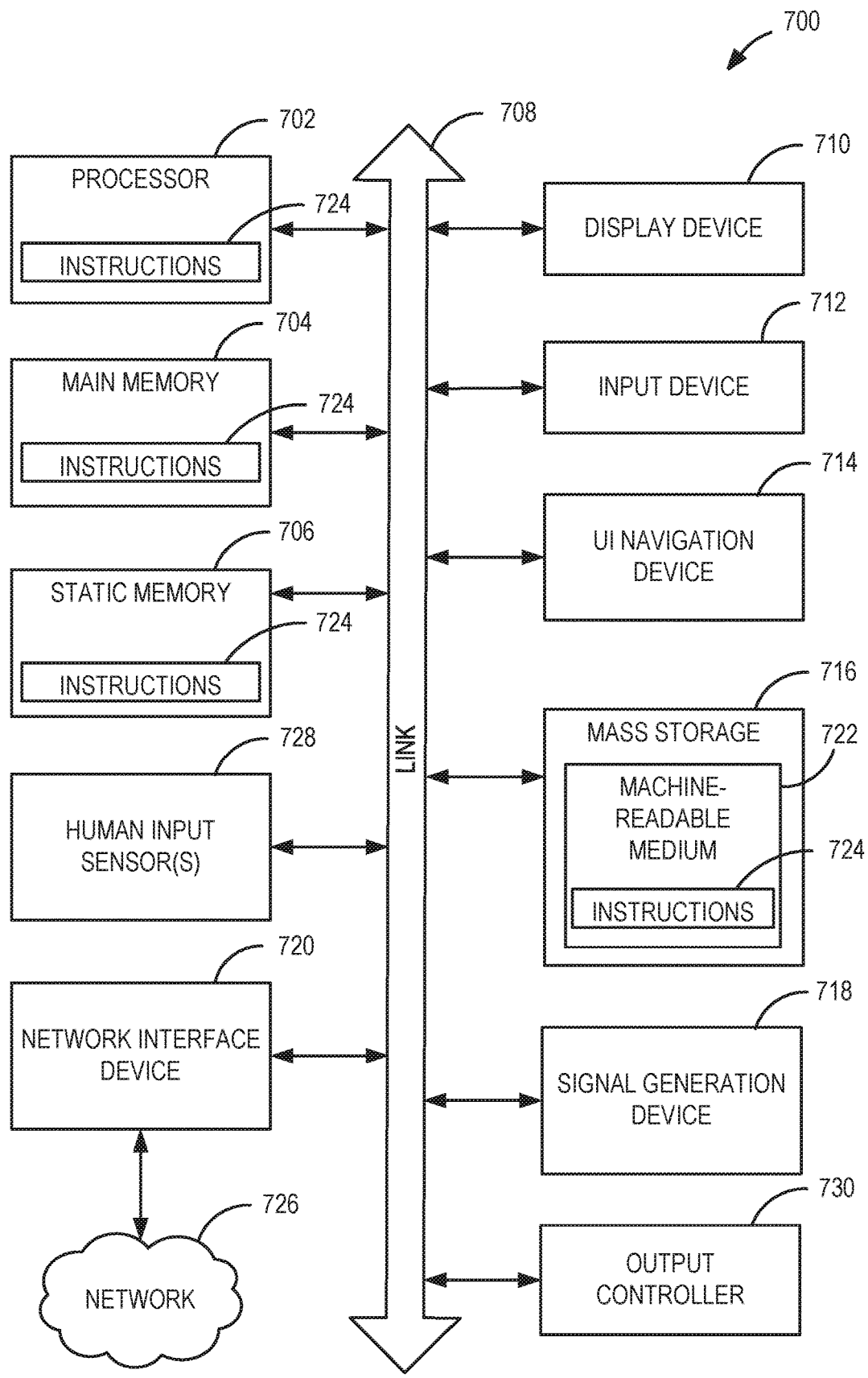
FIG. 7 illustrates a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Notes and Examples

The following, non-limiting examples, detail certain aspects of the present subject matter to solve the challenges and provide the benefits discussed herein, among others.

Example 1 is a method of operating a mobile cleaning robot in an environment, the method comprising: detecting, using an optical stream from the mobile cleaning robot, a seasonal object located in the environment; creating a seasonal cleaning zone based on the detected seasonal object when a current date is within a specified date range; and displaying the seasonal cleaning zone on a map of the environment.

In Example 2, the subject matter of Example 1 optionally includes receiving an adjustment to the seasonal cleaning zone; and updating the seasonal cleaning zone on the map based on the received adjustment.

In Example 3, the subject matter of Example 2 optionally includes creating a seasonal keep out zone within the seasonal cleaning zone; displaying the seasonal keep out zone on the map of the environment; receiving an adjustment to the seasonal keep out zone; and updating the seasonal keep out zone on the map based on the received adjustment.

In Example 4, the subject matter of any one or more of Examples 2-3 optionally include producing a seasonal object detection notification when seasonal cleaning zone is created and the current date is within the specified date range.

In Example 5, the subject matter of Example 4 optionally includes producing a seasonal object removal notification when the current date is outside the specified date range.

In Example 6, the subject matter of any one or more of Examples 1-5 optionally include transmitting the seasonal cleaning zone and the detected seasonal object to a remote device; operating the remote device to confirm the detection of the seasonal object and creation of the seasonal cleaning zone; and transmitting approval of the seasonal object and the seasonal cleaning zone from the remote device to the mobile cleaning robot.

In Example 7, the subject matter of any one or more of Examples 4-6 optionally include wherein the seasonal object is detected using an upper portion of the optical stream.

In Example 8, the subject matter of any one or more of Examples 1-7 optionally include increasing a cleaning parameter of the mobile cleaning robot within the seasonal cleaning zone.

In Example 9, the subject matter of any one or more of Examples 1-8 optionally include performing a cleaning operation within the environment based on the seasonal cleaning zone.

Example 10 is a method of operating a mobile cleaning robot within an environment, the method comprising: detecting, using an optical stream from the mobile cleaning robot, a seasonal object located in the environment; creating a seasonal cleaning zone based on the detected seasonal object when a current date is within a seasonal date range; and creating a seasonal keep out zone within the seasonal cleaning zone on a map of the environment.

In Example 11, the subject matter of Example 10 optionally includes operating a remote device to confirm the detection of the seasonal object and creation of the seasonal cleaning zone; and transmitting approval of the seasonal object and the seasonal cleaning zone from the remote device to the mobile cleaning robot.

In Example 12, the subject matter of Example 11 optionally includes producing a seasonal object creation notification when seasonal cleaning zone is created and the current date is within the seasonal date range.

In Example 13, the subject matter of Example 12 optionally includes displaying the seasonal cleaning zone on the map of the environment; receiving an adjustment to the seasonal cleaning zone; and updating the seasonal cleaning zone on the map based on the received adjustment.

In Example 14, the subject matter of Example 13 optionally includes displaying the seasonal keep out zone on the map of the environment; receiving an adjustment to the seasonal keep out zone; and updating the seasonal keep out zone on the map based on the received adjustment.

In Example 15, the subject matter of Example 14 optionally includes producing a seasonal object removal notification when the current date is outside the seasonal date range.

In Example 16, the subject matter of any one or more of Examples 10-15 optionally include wherein the seasonal object is detected using an upper portion of the optical stream.

In Example 17, the subject matter of any one or more of Examples 10-16 optionally include wherein the seasonal object is a holiday tree.

Example 18 is a non-transitory machine-readable medium including instructions, for operating a mobile cleaning robot in an environment, which when executed by a machine, cause the machine to: detect, using an optical stream, a seasonal object located in the environment; detect, using an optical stream from the mobile cleaning robot, a seasonal object located in the environment; create a seasonal cleaning zone based on the detected seasonal object when a current date is within a specified date range; and display the seasonal cleaning zone on a map of the environment.

In Example 19, the subject matter of Example 18 optionally includes the instructions to further cause the machine to: receive an adjustment to the seasonal cleaning zone; and update the seasonal cleaning zone on the map based on the received adjustment.

In Example 20, the subject matter of any one or more of Examples 18-19 optionally include the instructions to further cause the machine to: create a seasonal keep out zone within the seasonal cleaning zone; display the seasonal keep out zone on the map of the environment; receive an adjustment to the seasonal keep out zone; and update the seasonal keep out zone on the map based on the received adjustment.

In Example 21, the subject matter of any one or more of Examples 18-20 optionally include the instructions to further cause the machine to: produce a seasonal object detection notification when seasonal cleaning zone is created and the current date is within the specified date range.

In Example 22, the subject matter of any one or more of Examples 18-21 optionally include wherein the seasonal object is a holiday tree.

In Example 23, the apparatuses or method of any one or any combination of Examples 1-22 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of operating a mobile cleaning robot in an environment, the method comprising:
    detecting, using an optical stream from the mobile cleaning robot, a seasonal object located in the environment;
    determining whether a current date is within a specified date range associated with the seasonal object;
    creating a seasonal cleaning zone based on the detected seasonal object when the current date is within the specified date range;
    increasing a cleaning frequency of the mobile cleaning robot within the seasonal cleaning zone when the current date is within the specified date range; and
    displaying the seasonal cleaning zone on a map of the environment.

2. The method of claim 1, further comprising:
    receiving an adjustment to the seasonal cleaning zone; and
    updating the seasonal cleaning zone on the map based on the received adjustment.

3. The method of claim 2, further comprising:
    creating a seasonal keep out zone within the seasonal cleaning zone;
    displaying the seasonal keep out zone on the map of the environment;
    receiving an adjustment to the seasonal keep out zone; and
    updating the seasonal keep out zone on the map based on the received adjustment.

4. The method of claim 2, further comprising:
    producing a seasonal object detection notification when seasonal cleaning zone is created and the current date is within the specified date range.

5. The method of claim 4, further comprising:
    producing a seasonal object removal notification when the current date is outside the specified date range, the seasonal object removal notification indicating that the seasonal keep out zone should be removed.

6. The method of claim 1, further comprising:
transmitting the seasonal cleaning zone and the detected seasonal object to a remote device;
operating the remote device to confirm the detection of the seasonal object and creation of the seasonal cleaning zone; and
transmitting approval of the seasonal object and the seasonal cleaning zone from the remote device to the mobile cleaning robot.

7. The method of claim 4, wherein the seasonal object is detected using an upper portion of the optical stream.

8. The method of claim 1, further comprising:
increasing a cleaning parameter of the mobile cleaning robot within the seasonal cleaning zone.

9. The method of claim 1, further comprising:
performing a cleaning operation within the environment based on the seasonal cleaning zone.

10. A method of operating a mobile cleaning robot within an environment, the method comprising:
detecting, using an optical stream from the mobile cleaning robot, a seasonal object located in the environment;
determining whether a current date is within a specified date range associated with the seasonal object;
creating a seasonal cleaning zone based on the detected seasonal object when the current date is within the seasonal date range;
increasing a cleaning frequency of the mobile cleaning robot within the seasonal cleaning zone when the current date is within the specified date range; and
creating a seasonal keep out zone within the seasonal cleaning zone on a map of the environment.

11. The method of claim 10, further comprising:
operating a remote device to confirm the detection of the seasonal object and creation of the seasonal cleaning zone; and
transmitting approval of the seasonal object and the seasonal cleaning zone from the remote device to the mobile cleaning robot.

12. The method of claim 11, further comprising:
producing a seasonal object creation notification when seasonal cleaning zone is created and the current date is within the seasonal date range.

13. The method of claim 12, further comprising:
displaying the seasonal cleaning zone on the map of the environment;
receiving an adjustment to the seasonal cleaning zone; and
updating the seasonal cleaning zone on the map based on the received adjustment.

14. The method of claim 13, further comprising:
displaying the seasonal keep out zone on the map of the environment;
receiving an adjustment to the seasonal keep out zone; and
updating the seasonal keep out zone on the map based on the received adjustment.

15. The method of claim 14, further comprising:
producing a seasonal object removal notification when the current date is outside the seasonal date range.

16. The method of claim 10, wherein the seasonal object is detected using an upper portion of the optical stream.

17. The method of claim 10, wherein the seasonal object is a holiday tree.

18. A non-transitory machine-readable medium including instructions, for operating a mobile cleaning robot in an environment, which when executed by a machine, cause the machine to:
detect, using an optical stream from the mobile cleaning robot, a seasonal object located in the environment;
determining whether a current date is within a specified date range associated with the seasonal object;
create a seasonal cleaning zone based on the detected seasonal object when the current date is within the specified date range;
increase a cleaning frequency of the mobile cleaning robot within the seasonal cleaning zone when the current date is within the specified date range; and
display the seasonal cleaning zone on a map of the environment.

19. The non-transitory machine-readable medium of claim 18, the instructions to further cause the machine to:
receive an adjustment to the seasonal cleaning zone; and
update the seasonal cleaning zone on the map based on the received adjustment.

20. The non-transitory machine-readable medium of claim 18, the instructions to further cause the machine to:
create a seasonal keep out zone within the seasonal cleaning zone;
display the seasonal keep out zone on the map of the environment;
receive an adjustment to the seasonal keep out zone; and
update the seasonal keep out zone on the map based on the received adjustment.

21. The non-transitory machine-readable medium of claim 18, the instructions to further cause the machine to:
produce a seasonal object detection notification when seasonal cleaning zone is created and the current date is within the specified date range.

22. The non-transitory machine-readable medium of claim 18, wherein the seasonal object is a holiday tree.

* * * * *